(12) United States Patent
Croxford

(10) Patent No.: US 7,558,938 B2
(45) Date of Patent: Jul. 7, 2009

(54) MEMORY BUS ENCODING

(75) Inventor: Daren Croxford, Burwell (GB)

(73) Assignee: ARM Limited, Cambridge (GB)

( * ) Notice: Subject to any disclaimer, the term of this patent is extended or adjusted under 35 U.S.C. 154(b) by 123 days.

(21) Appl. No.: 11/349,348

(22) Filed: Feb. 8, 2006

(65) Prior Publication Data
US 2007/0260844 A1 Nov. 8, 2007

(51) Int. Cl.
*G06F 12/00* (2006.01)
(52) U.S. Cl. ................................... 711/202
(58) Field of Classification Search ............... 711/202
See application file for complete search history.

(56) References Cited

U.S. PATENT DOCUMENTS

| | | | | |
|---|---|---|---|---|
| 2,632,058 A * | 3/1953 | Gray | ........................ | 375/242 |
| 5,535,354 A * | 7/1996 | Reiff | ........................ | 711/217 |
| 5,778,415 A * | 7/1998 | Marietta et al. | ................. | 711/5 |
| 6,549,479 B2 * | 4/2003 | Blodgett | ........................ | 365/222 |
| 7,236,107 B2 * | 6/2007 | Fallah et al. | ................... | 341/51 |
| 7,302,597 B2 * | 11/2007 | Webster | ........................ | 713/320 |

OTHER PUBLICATIONS

C. L. Su et al. Low power architecture design and compilation techniques for high-performance processors. In IEEE COMPCON, Feb. 1994.*
W-C. Cheng and M. Pedram, "Power-optimal encoding for DRAM address bus," IEEE Transactions on VLSI Systems, vol. 10, No. 2, Apr. 2002, pp. 109-118.*
Cheng et al., "Low Power Techniques for Address Encoding and Memory Allocation", pp. 245-250, Proceedings of the 2001 Conference on Asia South Pacific Design Automation.

* cited by examiner

*Primary Examiner*—Matt Kim
*Assistant Examiner*—John P Fishburn
(74) *Attorney, Agent, or Firm*—Nixon & Vanderhye P.C.

(57) ABSTRACT

Encoding of logical addresses LA upon an off-chip memory bus 22 is performed to produce encoded addresses EA. The portion of the logical address encoded LA [9:3] does not include the least significant bits LA [2:0]. The number of bits LA [2:0] which are unencoded is chosen to correspond to a burst length BL supported by the memory 6 being accessed. Thus, burst mode accesses can be serviced by the memory 6 incrementing its memory address in the normal way. The encoding performed, such as Gray Encoding, reduces the Hamming distance between adjacent memory addresses in a sequence of memory addresses so as to reduce energy consumption.

32 Claims, 3 Drawing Sheets

MEMORY BUS ENCODING

BACKGROUND OF THE INVENTION

1. Field of the Invention

This invention relates to the field of data processing systems. More particularly, this invention relates to the encoding of memory bus addresses within data processing systems.

2. Description of the Prior Art

Off-chip memory bus connections tend to be physically larger and have a higher capacitance than on-chip memory bus lines. Accordingly, it consumes a disadvantageous amount of energy to drive such memory buses.

It is known to encode addresses on memory buses so as to reduce to Hamming distance between consecutive addresses. An example of such a technique is described in the paper "Low Power Techniques for Address Encoding And Memory Allocation" by Wei-Chung Cheng et al, Proceedings of the 2001 Conference on Asia South Pacific Design Automation Pages 245-250. By reducing the number of transitions which occur on the memory bus lines in the course of sequential memory accesses, such techniques reduce the energy consumed. Statistically sequential accesses are likely and accordingly such an encoding which reduces the Hamming distances for sequential accesses is advantageous and justifies the additional circuits required to perform the encoding.

A feature of some memory devices (e.g. SDRAM) is the ability to support burst mode transfers. When operating in burst mode such devices will receive a starting memory address and then return or write to a sequence of data values stored at locations following on from that starting address. The number of data values in the sequence may be set by a programmable burst length parameter. As an example, an SDRAM device which has been configured with a burst length of eight bytes would respond to a data read from a memory address by returning eight data values starting at that memory address and following on from that memory address.

SUMMARY OF THE INVENTION

Viewed from one aspect the present invention provides a memory controller for controlling burst mode memory access operations to a memory via an off-chip bus, said memory operating in a burst mode to support burst mode memory access operations having a burst length BL, said memory controller comprising:

address mapping logic operable to map an N-bit logical memory address LAi, where $N > i \geq 0$, received by said memory controller and specifying a start address of a burst mode memory access of burst length BL, to an M-bit encoded memory address EAj, where $M > j \geq 0$, to be output to said memory upon said off-chip bus; wherein said address mapping logic forms said encoded memory address by mapping a portion of said logical memory address LAk, where $p \geq \log_2 BL$, $X<N$, $X>k>p$ and $BL>1$, to a portion of said encoded memory address EAq, such that (i) LAi=EAj for i=j and i<p, and (ii) a sequence of adjacent values for said portion of said logical memory address LAk maps to a sequence of adjacent values for said portion of said encoded memory address EAq having a reduced average Hamming distance therebetween, whereby a burst mode transfer to adjacent logical memory addresses having a common value of said portion of said logical memory address LAk will result in accesses to memory locations in said memory having adjacent encoded memory addresses.

The present invention recognises and provides a solution to the problem that memory address encoding is not compatible with burst mode accesses. In particular, if sequential logical addresses are encoded to reduce the Hamming distance between the encoded addresses, then a standard burst mode device will respond by returning data values stored at a start address given by the encoded address passed to the device followed by data values for addresses formed by a simple non-encoded increment. Thus, incorrect data values would be returned for those addresses following the start address since the non-encoded increment would not follow the same sequence as an encoded increment. The present invention recognises this problem and provides the solution of encoding a portion of the logical address above a low order portion. The low order portion can be incremented in the standard way by the memory device in responding to a burst mode access. In this way, encoded memory addresses may be used with standard memory devices whilst still being able to exploit the burst mode capabilities of those standard memory devices for more efficient operation.

Whilst it will be appreciated that a wide variety of coding schemes can be applied to the portion of the logical address being encoded, e.g. pyramid coding, bus invert coding, T0 coding, working zone coding and alike, the present technique is well suited to the use of Gray coding. Gray coding limits the bit changes on sequential memory addresses to a single signal line in an efficient way and using a coding which is well understood and simple to implement.

Whilst it will be appreciated that the logical memory addresses and the encoded memory addresses could have different bit lengths, in preferred embodiments these bit lengths will be the same.

Similarly, the bit length of the portion of the logical memory address preferably equals the bit length of the portion of the encoded memory address. There is no need for a change in bit length and this arrangement provides an advantageously simple encoding.

It will be appreciated that depending upon the size of the portion of the logical memory address which is encoded, the burst length and the particular start address within burst boundaries that is chosen, it is possible for a burst mode access to span logical memory addresses for which there is a change in the value of the portion of the logical memory address which is encoded. Thus, a change in the portion of the encoded memory address is also necessary. In order to deal with this situation burst control logic is provided to detect such situations and split a burst mode transfer into a plurality of transfers, each of which has a logical memory address which remains unchanged within the smaller transfer.

In preferred embodiments of the invention the portion at the low order end of the logical memory address which is not encoded has a programmable length. It will be appreciated that memory devices can be programmed to support different burst lengths and accordingly flexibility in the lengths of the unencoded low significance portion of the logical memory addresses is provided to match this burst length programmability. It is possible that the programmable length of the unencoded low significance portion may be derived by the address mapping logic in dependence upon the burst length value which has been programmed.

Whilst the present technique can be used in a variety of different types of memory device, it is particularly useful in SDRAM memory and in synchronous burst static memory devices.

Within memory devices supporting burst mode accesses, a variety of different ways of incrementing the addresses may be employed during a burst mode transfer. With one configuration (which may be programmable) the device is operable in a wrapping mode in which burst mode transfers wrap within predetermined burst boundaries (e.g. within three bit address boundaries for eight byte bursts). In other modes, the burst transfers can correspond to a monotonic increment of the logical address or interleaved burst mode transfers at the burst length boundaries.

Viewed from another aspect the present invention provides a method for controlling burst mode memory access operations to a memory via an off-chip bus, said memory operating in a burst mode to support burst mode memory access operations having a burst length BL, said method comprising the steps of:

mapping an N-bit logical memory address LAi, where $N>i \geq 0$, specifying a start address of a burst mode memory access of burst length BL, to an M-bit encoded memory address EAj, where $M>j \geq 0$, to be output to said memory upon said off-chip bus; wherein said mapping forms said encoded memory address by mapping a portion of said logical memory address LAk, where $p \geq \log_2 BL$, $X<N$, $X \geq k \geq p$ and $BL>1$, to a portion of said encoded memory address EAq, such that (i) LAi=EAj for i=j and i<p, and (ii) a sequence of adjacent values for said portion of said logical memory address LAk maps to a sequence of adjacent values for said portion of said encoded memory address EAq having a reduced average Hamming distance therebetween, whereby a burst mode transfer to adjacent logical memory addresses having a common value of said portion of said logical memory address LAk will result in accesses to memory locations in said memory having adjacent encoded memory addresses.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
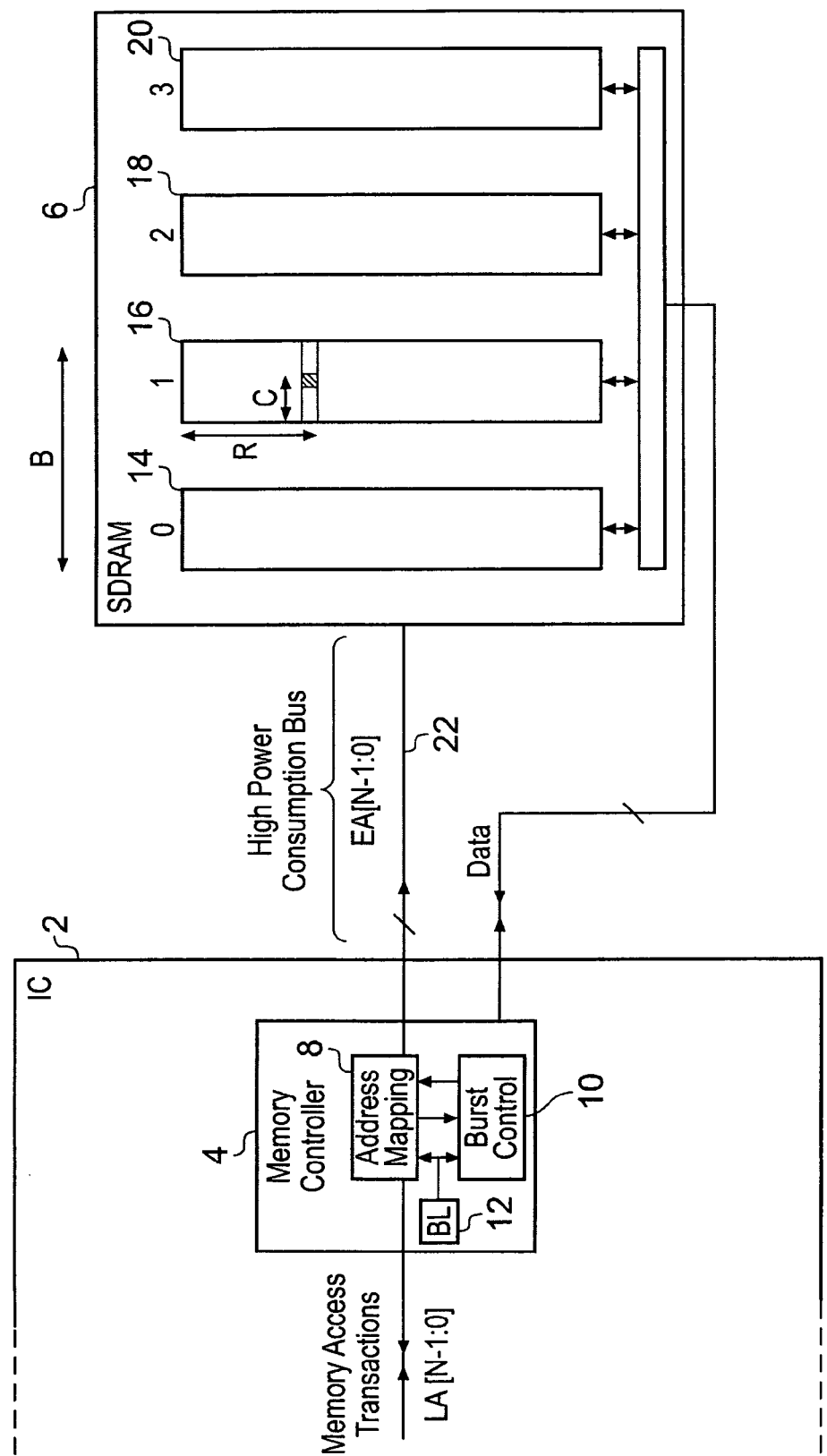
FIG. 1 illustrates an integrated circuit including a memory controller via which memory access transactions are passed to a memory device using an off-chip bus.

FIG. 1 illustrates an integrated circuit 2 including a memory controller 4. The memory controller 4 receives memory access transaction requests from other portions of the integrated circuit 2 (not illustrated) and then controls memory accesses to a memory device 6, in this example a four bank SDRAM memory. Within the memory controller 4 there is provided an address mapping circuit 8 and burst control logic 10 as well as other elements. A burst length register 12 is programmable under software control to specify a burst length BL to be used.

Within the memory device 6, there are provided four banks of memory 14, 16, 18, 20. Two bits B within the address applied EA to the memory 6 select the bank to be accessed. Within each bank a plurality of rows of bit storage elements are provided. The row to be accessed is selected by another portion R of the memory address EA applied to the memory 6. Finally, the individual column within the selected row is identified by another bit field C within the memory address. The data values within the column are selected and is driven out of the memory 6 and returned to the integrated circuit 2.

It will be appreciated that the memory bus 22 provided between the integrated circuit 2 and the memory 6 is an off-chip bus. Accordingly, this bus will typically have relatively high capacitance bit lines and require a relatively high amount of energy to drive.

Figure 2:
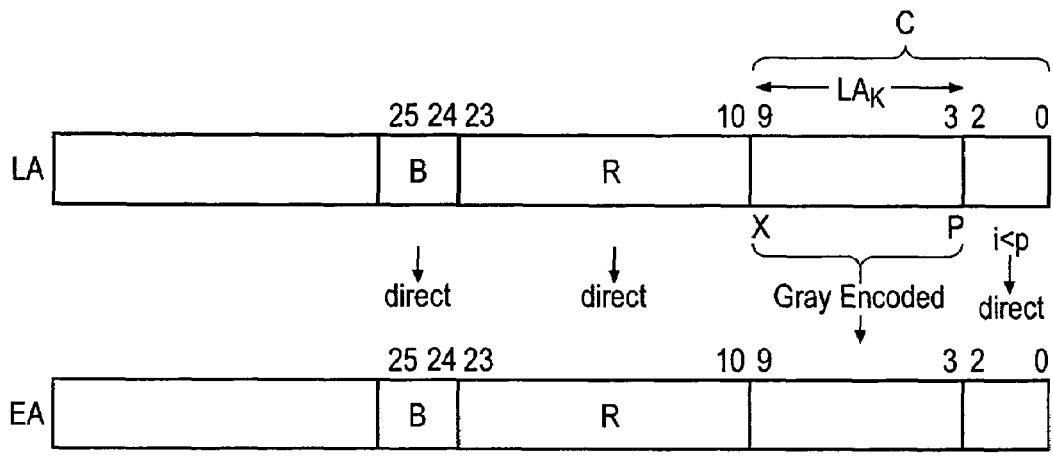
FIG. 2 illustrates the mapping of a logical memory address to an encoded memory address.

In order to reduce the Hamming distance between the addresses driven on the memory address bus 22 for sequential accesses, the address mapping circuit 8 serves to remap a portion of the logical address LA into an encoded address EA. FIG. 2 illustrates this mapping between the logical address LA and the encoded address EA in more detail. A lower ten bits of the logic address LA provide the column address C for use within memory bank 14, 16, 18, 20. The burst lengths BL programmed within the register 12 in this example is eight bytes. Accordingly, the three least significant (low order) bits LA [2:0] of the logical address LA are not changed in the mapping and are passed directly from the logical address to the encoded address. If the bursts are burst boundary aligned, then only these three bits would change during the burst values for sequential logical address would be returned by sequential encoded addresses starting from the specified encoded address supplied to the memory 6. The burst may be made burst boundary aligned either by virtue of starting at a burst boundary or by operation of a wrapping mode within the memory 6 whereby burst sequences wrap within burst boundaries with those boundaries being programmably set in accordance with the burst length BL.

The bits LA [9:3] of the logical address LA form the portion of the logical memory address which is Gray encoded to form a corresponding portion EA [9:3] of the encoded address EA. Gray encoding ensures a reduced Hamming distance between adjacent addresses within a sequence of addresses for the encoded address EA. Whilst it will be appreciated that the Gray encoding could be performed for all of the bits above bits of the logical address LA, and including [3], in practice the row R and bank B specifying portions of the logical memory address LA will be time division multiplexed on the bus 22 and accordingly will not be present if only the column specifying portion C of the encoded address EA [9:0] is being changed. Accordingly, the circuitry required to encode the portions of the logical address above and including bit LA [10] is not justified by power saving obtained in practice and accordingly these bits LA [31:10] are directly mapped to the corresponding bits EA [31:10] within the encoded address EA.

FIG. 2 shows the address being converted to Bank, Row, Column. It will be appreciated that the address mapping could be performed in many other ways, such as, for example; Row, Bank, Column or Bank, RowUpper, ColumnUpper, RowLower, ColumnLower.

Figure 3:
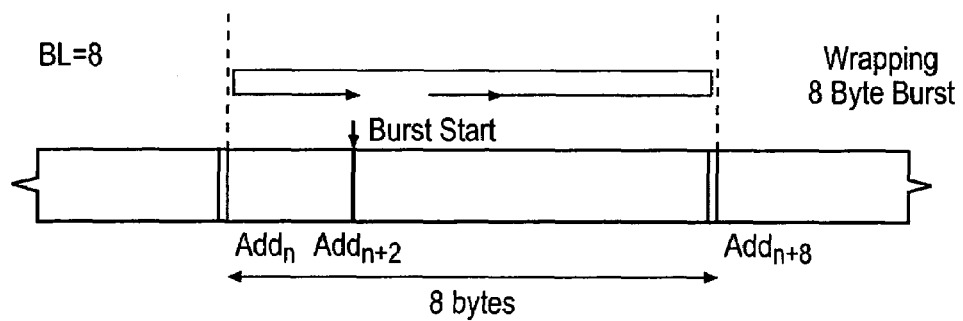
FIG. 3 illustrates a burst mode transfer with wrapping within burst boundaries.

FIG. 3 schematically illustrates a eight byte burst mode access with the memory 6 set up for burst wrapping. With this type of operation, whilst the burst mode access may not start at a burst boundary it nevertheless wraps around the burst boundaries to return to the start position. Accordingly, the portion of the encoded memory address is unchanged during this wrapping burst mode access and the correct data will be returned.

Figure 4:
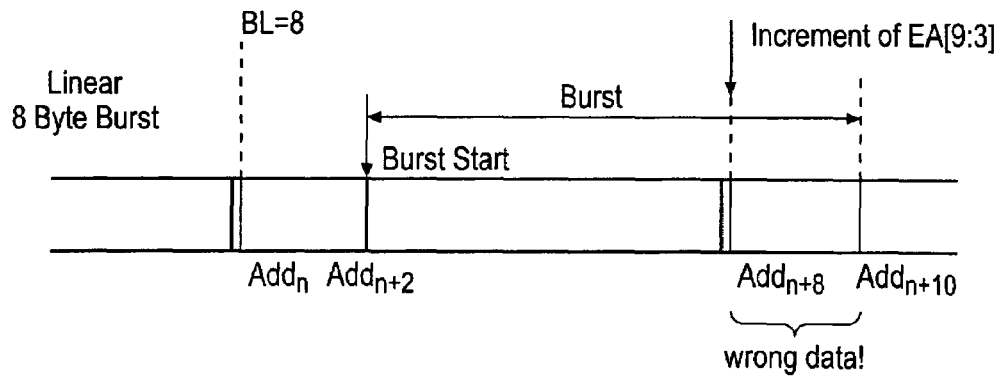
FIG. 4 illustrates a burst mode transfer with linear address incrementing.

In contrast to the situation illustrated in FIG. 3, FIG. 4 illustrates memory 6 operating in a linear burst mode in which memory addresses within the memory device are monotonically sequentially incremented during a burst. If the burst does not start aligned with a burst boundary, and has a length such that it will cross a burst boundary as is illustrated in FIG. 4, then at the point at which it crosses that burst boundary, the memory device will increment the portion of the encoded address which was derived by the Gray encoding. A simple increment of this value does not produce the same result as would be produced by incrementing the original logical address portion and then Gray encoding that incremented value. Accordingly, the last two bytes of data returned in the example of FIG. 4 will be incorrect since the encoded address for these last two bytes is at a different point within the memory.

Figure 5:
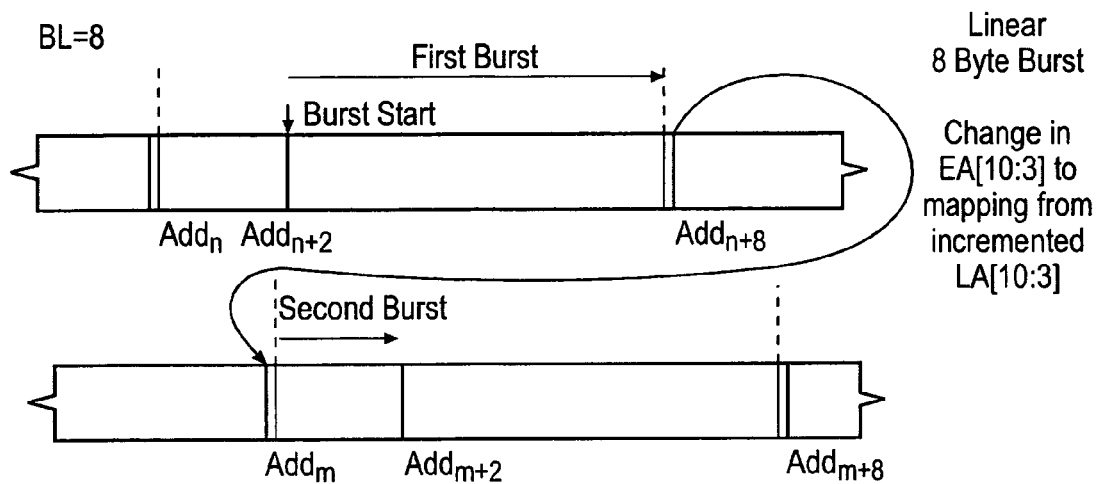
FIG. 5 illustrates the situation of FIG. 4 in which the burst is split.

FIG. 5 schematically illustrates how the error of FIG. 4 maybe avoided. As illustrated in FIG. 5, the first six bytes of the burst are returned starting from the specified start address. When the burst boundary is reached, then this is detected by the burst control logic 10 and the burst is terminated. A second burst is then initiated using a start address derived by incrementing the logical address for the burst and then encoding that incremented value.

Figure 6:
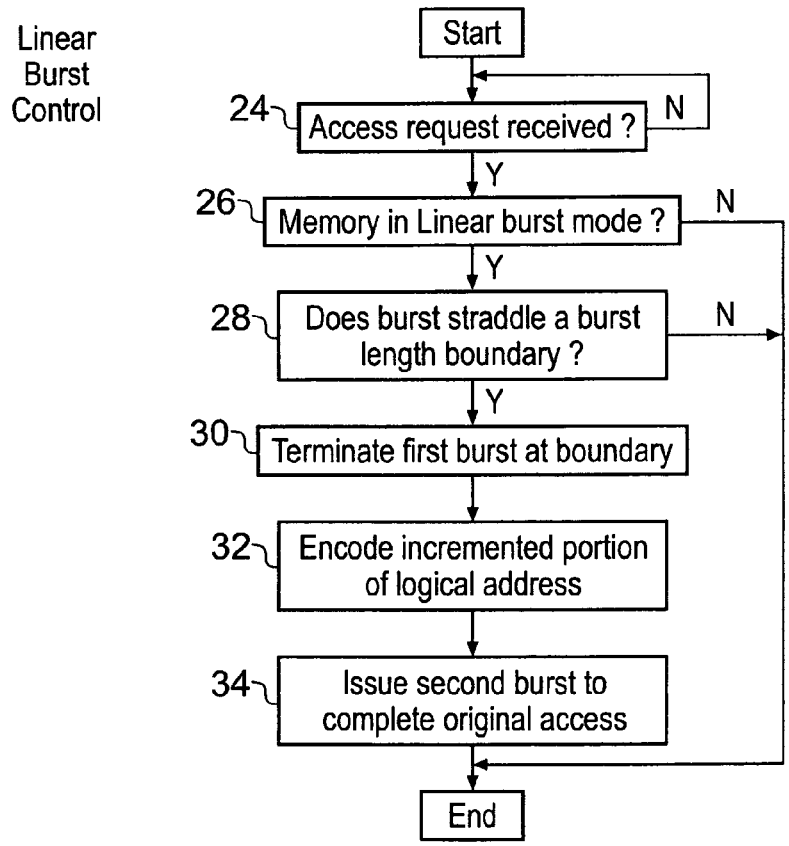
FIG. 6 is a flow diagram illustrating schematically the control performed in identifying and correcting situations such as are illustrated in FIGS. 4 and 5.

FIG. 6 is a flow diagram illustrating the operation in FIG. 5. At step 24, the burst control logic 10 waits for an access request to be received. When such an access request is received, a check is made at step 26 as to whether the memory device 6 is operating in a linear burst mode. If the memory device is not operating in a linear burst mode or equivalent, then the problem illustrated in FIG. 5 will not exhibit itself. It will be appreciated that this problem could arise in a variety of ways not limited to a monotonic increment of the logical memory address being the assumed operation of the memory 6. In particular, some memory devices support burst mode transfers which are interleaved at burst length boundaries. These accesses may also be adapted to early termination and the reissuing of the bursts starting from a correctly encoded incremented logical address for the portions after the burst boundaries.

Returning to FIG. 6, if the memory device 6 is in a linear burst mode, then processing proceeds to step 28 at which a determination is made as to whether or not the burst straddles it a burst length boundary. If the burst does straddle a burst length boundary, then step 30 serves to terminate the burst when that boundary is reached. Step 32 then serves to encode an incremented portion of the logical address corresponding to the initial memory access. Step 34 then issues a second burst access using the encoded address derived at step 32 so as to complete the original access.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A memory controller for controlling burst mode memory access operations to a memory via an off-chip bus, said memory operating in a burst mode to support burst mode memory access operations having a burst length BL, said memory controller comprising:

address mapping logic operable to map an N-bit logical memory address LAi, where N>i≧0, received by said memory controller and specifying a start address of a burst mode memory access of burst length BL, to an M-bit encoded memory address EAj, where M>j≧0, to be output to said memory upon said off-chip bus; wherein said address mapping logic forms said encoded memory address by mapping a portion, LAk, of said logical memory address LAi, where p and X are integers given by p>log$_2$BL, X<N, X≧k≧p and BL>1, to a portion of said encoded memory address EAq, such that (i) LAi=EAj for i=j and i<p, and
(ii) a sequence of adjacent values for said portion of said logical memory address LAk maps to a sequence of adjacent values for said portion of said encoded memory address EAq having a reduced average Hamming distance therebetween, whereby a burst mode transfer to adjacent logical memory addresses having a common value of said portion of said logical memory address LAk will result in accesses to memory locations in said memory having adjacent encoded memory addresses.

2. A memory controller as claimed in claim 1, wherein said address mapping logic applies a Gray coding to said portion of said logical memory address LAk to form said portion of said encoded memory address EAg.

3. A memory controller as claimed in claim 1, wherein N=M.

4. A memory controller as claimed in claim 1, wherein a bit length of said portion of said logical memory address LAk equals a bit length of said portion of said encoded memory address EAq.

5. A memory controller as claimed in claim 1, further comprising:

burst control logic responsive to detection of a burst mode transfer to adjacent logical memory addresses resulting in a change in said portion of said logical memory address LAk during said burst mode transfer to split said burst mode transfer into a plurality of transfers for each of which said portion of said logical memory address LAk remains unchanged.

6. A memory controller as claimed in claim 5, wherein said burst mode transfer is split into two transfers.

7. A memory controller as claimed in claim 5, wherein memory accesses corresponding to said burst mode transfer are performed by:

proceeding with said burst mode transfer up to a point at which said portion of said logical memory address LAk changes;
terminating said burst mode transfer at said point; and
issuing a further burst mode transfer using a new value of said portion of said logical memory address LAk.

8. A memory controller as claimed in claim 1, wherein p is a programmable parameter.

9. A memory controller as claimed in claim 1, wherein BL is a programmable parameter.

10. A memory controller as claimed in claim 9, wherein p is derived by said address mapping logic in dependence upon BL.

11. A memory controller as claimed in claim 1, wherein said memory is an SDRAM memory.

12. A memory controller as claimed in claim 1, wherein said memory is a synchronous burst static memory.

13. A memory controller as claimed in claim 1, wherein said memory is operable in a wrapping mode in which burst mode transfers wrap within predetermined boundaries.

14. A memory controller as claimed in claim 13, wherein said predetermined boundaries are spaced apart by $2^p$ memory addresses.

15. A memory controller as claimed in claim 1, wherein said burst mode transfers correspond to a monotonic increment of said logical memory address.

16. A memory controller as claimed in claim 1, wherein said burst mode transfers are interleaved at burst length boundaries.

17. A method for controlling burst mode memory access operations to a memory via an off-chip bus, said memory operating in a burst mode to support burst mode memory access operations having a burst length BL, said method comprising the steps of:

mapping an N-bit logical memory address LAi, where $N>i\geq 0$, specifying a start address of a burst mode memory access of burst length BL, to an M-bit encoded memory address EAj, where $M>j\geq 0$, to be output to said memory upon said off-chip bus; wherein said mapping forms said encoded memory address by mapping a portion, LAK, of said logical memory address LAi, where p and X are integers given by $p\geq\log_2 BL$, $X<N$, $X\geq k\geq p$ and $BL>1$, to a portion of said encoded memory address EAq, such that (i) LAi=EAj for i=j and i<p, and
(ii) a sequence of adjacent values for said portion of said logical memory address LAk maps to a sequence of adjacent values for said portion of said encoded memory address EAq having a reduced average Hamming distance therebetween, whereby a burst mode transfer to adjacent logical memory addresses having a common value of said portion of said logical memory address LAk will result in accesses to memory locations in said memory having adjacent encoded memory addresses.

18. A method as claimed in claim 17, wherein said mapping applies a Gray coding to said portion of said logical memory address LAk to form said portion of said encoded memory address EAq.

19. A method as claimed in claim 17, wherein N=M.

20. A method as claimed in claim 17, wherein a bit length of said portion of said logical memory address LAk equals a bit length of said portion of said encoded memory address EAq.

21. A method as claimed in claim 17, further comprising the step of:

in response to detection of a burst mode transfer to adjacent logical memory addresses resulting in a change in said portion of said logical memory address LAk during said burst mode transfer, splitting said burst mode transfer into a plurality of transfers for each of which said portion of said logical memory address LAk remains unchanged.

22. A method as claimed in claim 21, wherein said burst mode transfer is split into two transfers.

23. A method as claimed in claim 21, wherein memory accesses corresponding to said burst mode transfer are performed by:

proceeding with said burst mode transfer up to a point at which said portion of said logical memory address LAk changes;

terminating said burst mode transfer at said point; and issuing a further burst mode transfer using a new value of said portion of said logical memory address LAk.

24. A method as claimed in claim 17, wherein p is a programmable parameter.

25. A method as claimed in claim 17, wherein BL is a programmable parameter.

26. A method as claimed in claim 25, wherein p is derived by said address mapping logic in dependence upon BL.

27. A method as claimed in claim 17, wherein said memory is an SDRAM memory.

28. A method as claimed in claim 17, wherein said memory is a synchronous burst static memory.

29. A method as claimed in claim 17, wherein said memory is operable in a wrapping mode in which burst mode transfers wrap within predetermined boundaries.

30. A method as claimed in claim 29, wherein said predetermined boundaries are spaced apart by $2^p$ memory addresses.

31. A method as claimed in claim 17, wherein said burst mode transfers correspond to a monotonic increment of said logical memory address.

32. A method as claimed in claim 17, wherein said burst mode transfers are interleaved at burst length boundaries.

* * * * *